United States Patent [19]

Dobran

[11] Patent Number: 4,959,566
[45] Date of Patent: Sep. 25, 1990

[54] LITHIUM-SULFUR HEXAFLUORIDE MAGNETOHYDRODYNAMIC POWER SYSTEM CONFIGURATIONS AND SYSTEM DESIGN CONSIDERATIONS

[75] Inventor: Flavio Dobran, 21st & Broadway, Long Island City, N.Y. 11106

[73] Assignee: Flavio Dobran, Long Island City, N.Y.

[21] Appl. No.: 338,103

[22] Filed: Apr. 14, 1989

[51] Int. Cl.$^5$ .................................. H02K 44/08
[52] U.S. Cl. .................................................. 310/11
[58] Field of Search ......................................... 310/11

[56] References Cited

U.S. PATENT DOCUMENTS 4,645,959 2/1987 Dobran .................................. 310/11

Primary Examiner—Steven L. Stephan
Assistant Examiner—Judson H. Jones

[57] ABSTRACT

A lithium-sulfur hexafluoride magnetohydrodynamic power system may be operated with different arrangements of the system components. The internal combustion process between lithium and sulfur-hexafluoride may be achieved in the MHD generator or externally, and the lithium transporting fluid may be a gas or a vaporizable liquid which vaporizes from the heat released in combustion. The lithium, sulfur-hexafluoride and transporting fluids may be mixed at the generator inlet where the heat released in combustion is used by the expanding gas in the generator to transport the lithium through the channel for the production of the electrical power. This system configuration produces the most compact and also the most complex design. In another system configuration, the lithium and sulfur-hexafluoride can be reacted before or near the generator inlet and the exiting fluid from the generator may be mixed with the transporting gas or vaporizable fluid in a mixer/nozzle unit where the thermal energy of combustion is used to expand the gas and therefore provide a pressure gradient for the lithium transport through the system. The MHD generator may also operate only with lithium without combustion in the channel, whereby the exiting lithium from the generator is mixed with the sulfur-hexafluoride gas and with the transporting fluid in a mixer/combustor/nozzle unit. The later arrangements of system components allow for efficient operations of induction magnets and can decrease the complexities of the system design. The sulfur-hexafluoride gas injector should be designed with many nozzles to produce small bubbles of injected gas for the purpose of achieving an efficient combustion. These nozzles should be opened and closed by needles which are controlled by the suitable operating parameters of the system.

5 Claims, 2 Drawing Sheets

FIG. 1 – PRIOR ART

LITHIUM-SULFUR HEXAFLUORIDE MAGNETOHYDRODYNAMIC POWER SYSTEM CONFIGURATIONS AND SYSTEM DESIGN CONSIDERATIONS

BRIEF DESCRIPTION

In a previous invention, U.S. Pat. No. 4,645,959, the basic operation of a lithium-sulfur hexafluoride magnetohydrodynamic (MHD) power system was described. This MHD system utilizes the flow of lithium from about 1100–1600 degrees Kelvin through the MHD channel to produce the electrical power output. The lithium flow through the channel is obtained by using a transporting gas whose energy of expansion is derived from the energy released in combustion between liquid lithium and sulfur hexafluoride gas. Depending on the methods of mixing the liquid lithium with sulfur hexafluoride and transporting gases, different system configurations may be obtained with different system efficiencies and construction characteristics. The lithium, sulfur hexafluoride and transporting fluids may be mixed at the MHD channel inlet or downstream of the channel, and the transporting gas may or may not be a vaporizable liquid or operate in an open or closed cycle system. Moreover, the MHD magnet may be a conduction magnet requiring sidewall electrodes or an induction magnet requiring no sidewall electrodes. Different methods of integrating the system components can be used to develop different systems, thus allowing a great deal of flexibility in the development of the lithium-sulfur hexafluoride MHD power system. The most compact system configuration should be obtainable by integrating the mixing and combustion processes into the MHD channel. However, the efficient design of the system involving induction magnets calls for the operation of the MHD channel only with lithium and requiring that the combustion process and expansion of the transporting fluid takes place downstream of the generator in the nozzle. The low pressure liquid/gas mixture exiting from the nozzle should enter the liquid/gas separator in subsonic flow, and the transporting gas should be a vaporizable liquid. The design of the sulfur hexafluoride gas injector should employ many nozzles with the flow controlled by needles which are adjustable by suitable operating parameters of the system.

The practical embodiment of lithium-sulfur hexafluoride magnetohydrodynamic system components can be better understood by a reference to the accompanying drawings.

DETAILED DESCRIPTION

Figure 1:
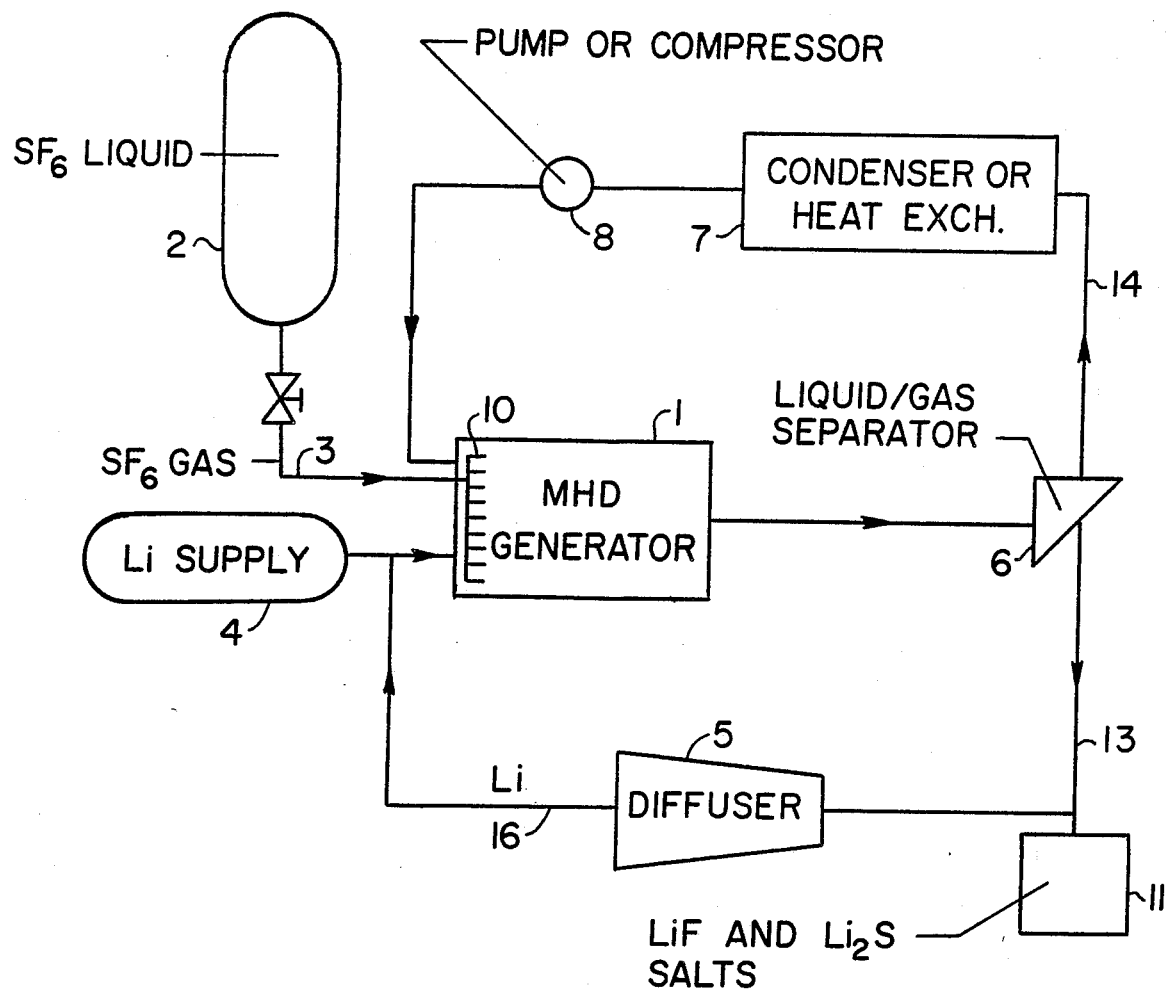
FIG. 1 is a schematic and prior art of a system with lithium-sulfur hexafluoride combustion and expansion of the transporting gas inside the MHD channel.

A very compact lithium-sulfur hexafluoride (Li—$SF_6$) MHD power system is illustrated in FIG. 1. It consists of an MHD generator 1 (MHD channel and magnet), lithium and sulfur hexafluoride supply tanks 4 and 2, liquid/gas separator 6, lithium salts removal system 11 (cold trap), lithium pump or diffuser 5, and transporting gas condenser or heat exchanger 7 with or without the pump or compressor 8, depending on whether or not the transporting fluid cycle is open or closed and the transporting fluid is a vaporizable fluid. The unique feature of the MHD system in FIG. 1 (prior art, U.S. Pat. No. 4,645,959) is the internal combustion process involving Li and $SF_6$ which produces energy for the lithium flow through the MHD channel from which the electrical power is extracted by the generator. Since only part of the heat release in combustion between Li and $SF_6$ is converted into the mechanical energy of lithium in the channel and into electrical power, it is clear that different arrangements of system components shown in FIGS. 1 to 3 can produce different system efficiencies.

The combustion of Li with gaseous $SF_6$ produces liquid products of combustion (LiF and $Li_2S$ salts) between 1065 and 1638 degrees Kelvin with densities which are different from Li. Consequently, the products of combustion can be easily removed by a cold trap 11 maintained below 1065 degrees Kelvin which collects the solid products. The combustion process between lithium and sulfur hexafluoride cannot, however, create a sufficient pressure increase for the Li flow through the system (since this energy is mainly used for the thermal energy increase of the fluid) in order to create a significant MHD effect, and another working fluid must be used for this purpose. The original patent shown in FIG. 1 contemplated using a neutral noncondensable gas whereby the heat released in combustion is largely used to heat the gas which subsequently expands in the channel and transports the lithium through the system. The liquid/gas mixture exiting from the MHD channel 1 is separated into liquid 13 and gas 14 streams. The liquid salts, LiF and $Li_2S$, are then removed from the liquid mixture and lithium is pumped by a pump or diffuser 5 to the generator inlet pressure. The separated gas 14 is either rejected or cooled and compressed to the required generator inlet pressure. From the thermodynamical point of view, the use of a condensable gas for the transporting fluid is better since it produces higher system efficiencies and more compact system configurations. One such fluid is cesium which vaporizes from the heat released in combustion and expands to a low pressure at the generator exit. The cesium vapor exiting from the liquid/gas separator 6 can be effectively condensed in the condenser 7 and pumped to the generator inlet pressure. The important characteristic of the system in FIG. 1 is that the mixing, combustion, heating or vaporization (if any) of Li, $SF_6$ and transporting gas takes place in the MHD generator 1 which can produce a very compact and light-weight system configuration for operations in space, on the earth, or underwater.

The Li and $SF_6$ flow at high temperatures can produce, however, material insulation problems when the MHD channel uses sidewall electrodes or the generator utilizes a conduction magnet. To avoid the sidewall channel electrodes for collection of electrical current, an induction or selfexcited magnet may be used instead which produces high a.c. voltages and can minimize problems associated with the electrical power conditioning from the generator. The use of an induction magnet requires, however, a high electrical conductivity of the fluid in the generator in order to obtain an optimum ratio of fluid and electromagnetic field velocities in the channel. A high gas volumetric fraction two-phase mixture of conducting Li and badly conducting gas in the channel 1 is thus undesirable for the efficient operation of the induction magnet, and system components shown in FIG. 1 can be arranged as shown in FIGS. 2 and 3 to achieve better system performance.

Figure 2:
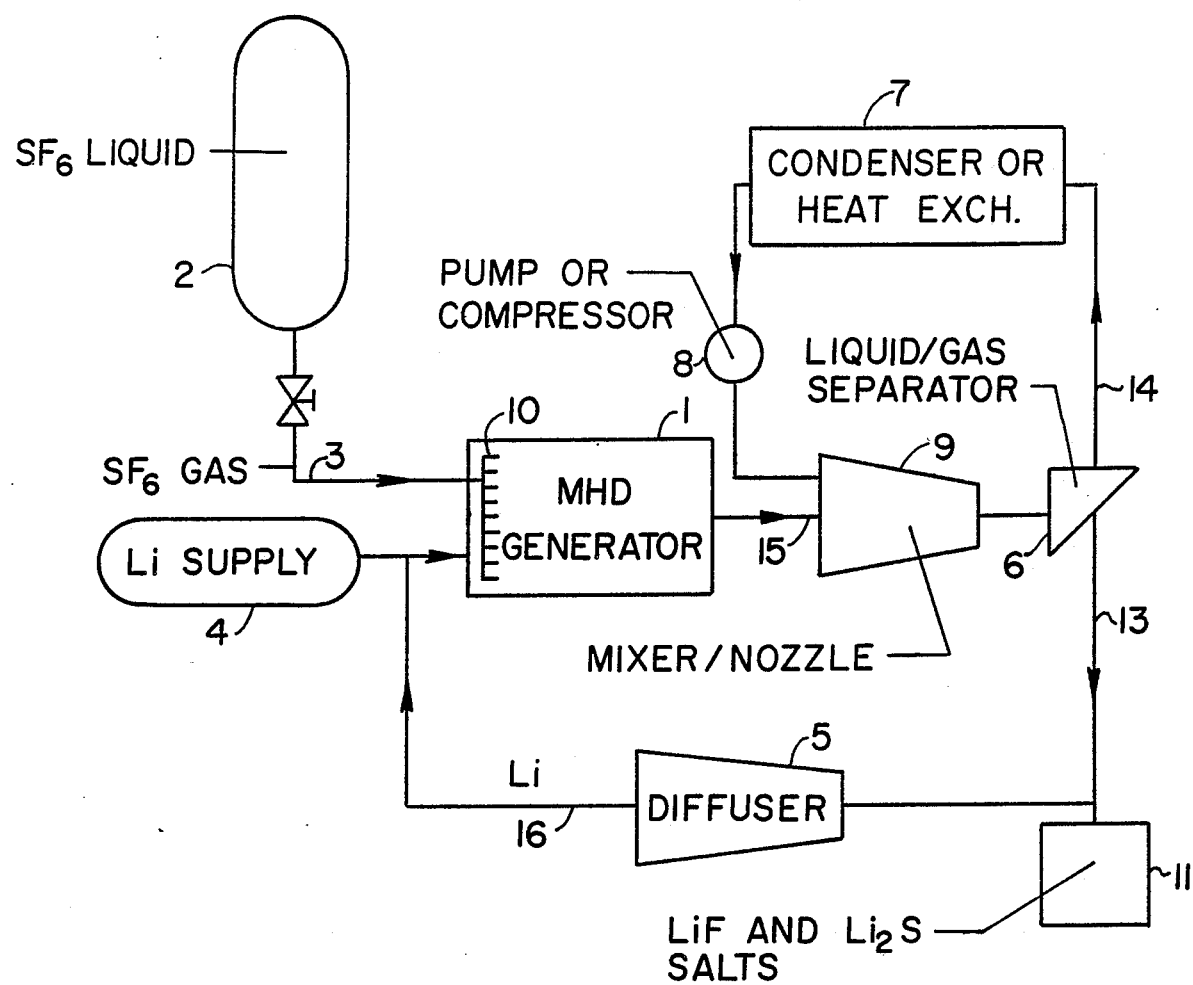
FIG. 2 shows the embodiment of system components with lithium-sulfur hexafluoride combustion inside the MHD channel, and expansion of the transporting gas and mixing with lithium downstream of the channel in the mixer/nozzle unit.

In the system components configuration shown in FIG. 2, the mixing and combustion of Li and $SF_6$ occurs in the channel 1, whereas the injection of the transporting gas 8 and mixing with the fluid exiting from the generator at 15 occurs downstream of the generator in a mixer 9 with subsequent expansion of the liquid/gas mixture in a nozzle and separation of liquid and gas in a separator 6. Since the Li recirculation through the system 16 must be much larger than that used in combustion to produce an effective MHD effect, all of the $SF_6$ gas 3 introduced into the MHD channel is used in combustion, with only liquid products of combustion and Li exiting from the channel. The energy released in combustion is transferred to the gas or vaporizing fluid in the mixer/nozzle 9 where it expands and provides the driving pressure gradient for the Li flow through the system. The introduction of $SF_6$ gas at the generator inlet section produces a negligible decrease of the effective electrical conductivity of the fluid from that of pure Li (due to much larger Li recirculation rate than used in combustion) and should produce a simpler design of the $SF_6$ injector 10 than in the system configuration of FIG. 1 or original patent. However, a drawback of the system of FIG. 2 is that the thermal energy released in combustion in the MHD channel 1 is not used immediately, but it is transported for use in the mixer/nozzle 9, thus having the potential of increasing the system irreversibilities.

Figure 3:
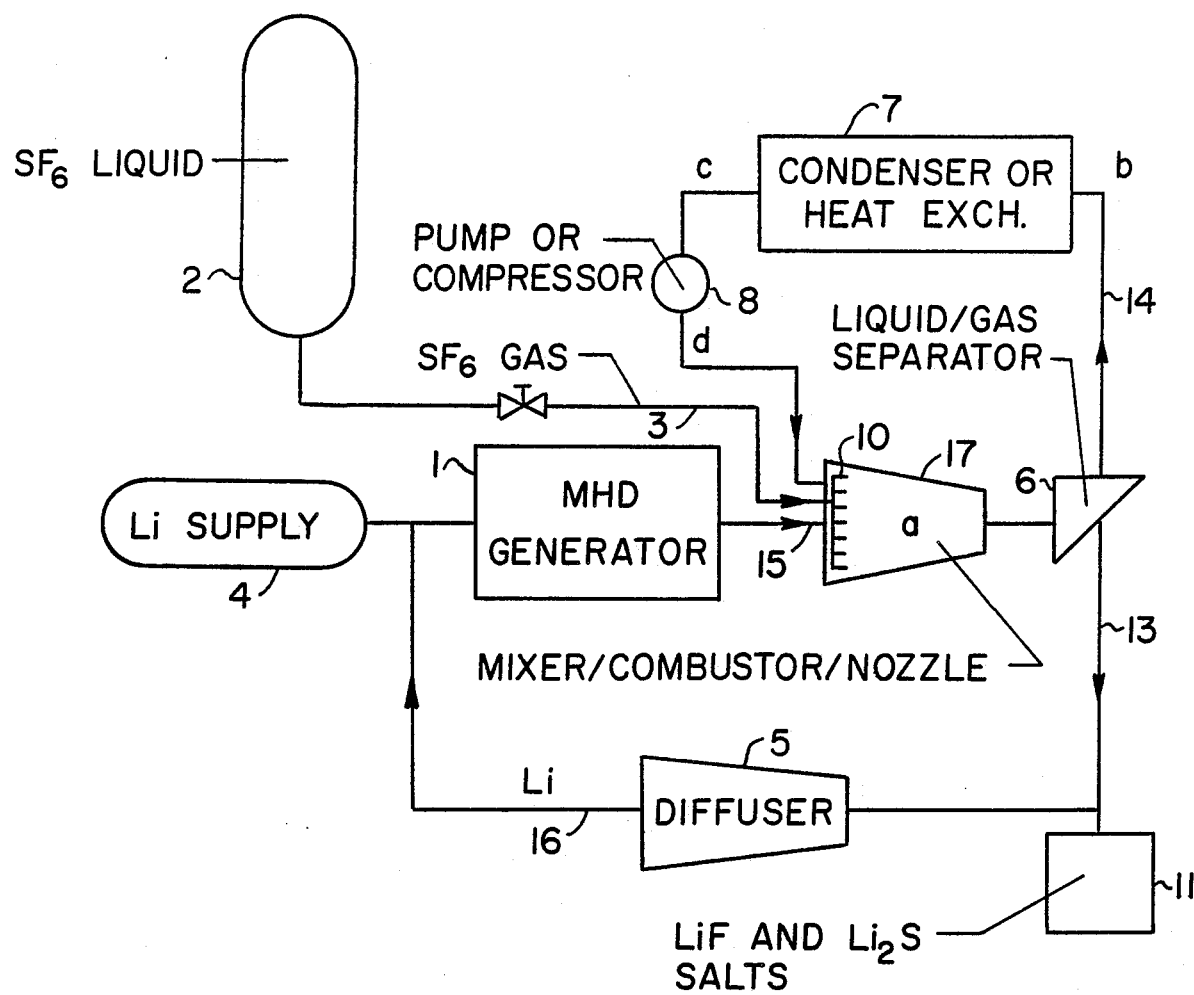
FIG. 3 shows the embodiment of system components with lithium-sulfur hexafluoride whereby lithium, sulfur hexafluoride and transporting fluid are mixed and reaction between lithium and sulfur hexafluoride takes place downstream of the MHD channel in the mixer/combustor/nozzle unit.

From the thermodynamical point of view, the system configuration of FIG. 3 should be better than the system shown in FIG. 2, since the released energy of combustion is used immediately for heating the gas (or for vaporizing a liquid) and expanding the liquid/gas mixture to a low pressure in a mixer/combustor/nozzle 17. However, the design of an efficient unit 17 can be complicated since this device must be designed for multi-phase and multicomponent fluid flow with combustion, heat transfer, and gas expansion to a low pressure. The placement of the MHD generator 1 after the mixer/nozzle 9 in FIG. 2 or mixer/combustor/nozzle 17 in FIG. 3 is clearly undesirable, since the MHD channel would then operate in two-phase high velocity flow producing low induction generator efficiencies and large frictional pressure drops or system irreversibilities.

The MHD power system configurations shown in FIGS. 1-3 do not have to employ the Li supply tank 4 and salts storage unit 11. When the Li supply tank is absent, the original charge of lithium in the system is depleted with time as Li is being reacted with $SF_6$. The electrical power output from the generator then deteriorates with time owing to the decreasing rate of Li recirculation through the generator. When the salts storage tank or cold trap is eliminated, a part of the energy released in combustion must be expended to circulate the salts through the system. The LiF and $Li_2S$ salts are bad conductors of electricity and do not appear to serve a useful purpose, unless they can be recombined into other useful substances.

Figure 4:
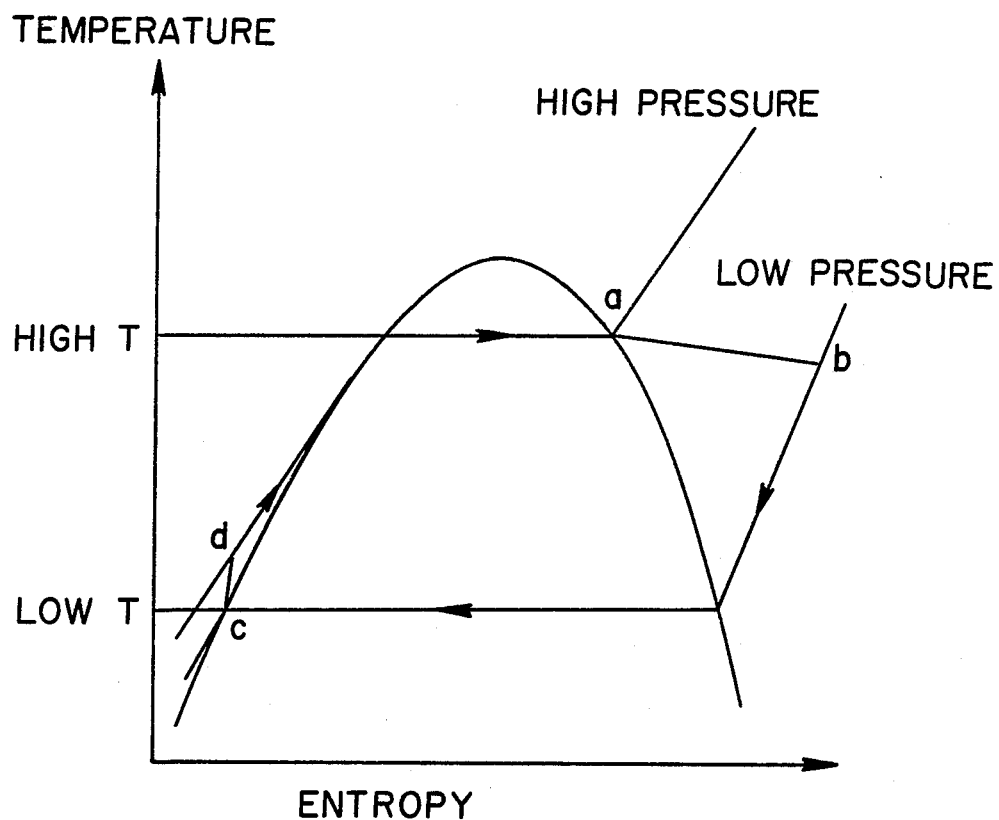
FIG. 4 illustrates a thermodynamic diagram of a condensable fluid cycle employed for the purpose of pumping the lithium through the MHD channel. The points a, b, c, and d on this diagram correspond to the cycle locations in FIG. 3.

The $SF_6$ gas injector 10 must be designed to prevent Li flow into the gas manifold lines 3 and to produce fine bubble "sprays" for an efficient combustion process. This design may be accomplished with an injector with many small nozzles which open or close by means of needles controlled by the liquid pressure of $SF_6$ in the supply tank 2 or by means of another system control variable, such as by the electrical power output or system temperature. The use of a vaporizing fluid, such as cesium, for transporting Li through the system has thermodynamic advantages since it can produce large system efficiencies and compact heat exchanger design. For space-based systems, the cesium radiator can be constructed from deployable heat pipe radiators. The large MHD generators can also be effectively cooled by cesium or potasium heat pipes operating from 600-900 degrees Kelvin in order to keep the magnet temperature below the Curie temperature where the magnet looses its magnetic properties. The operation of the gas/liquid inclined plate separator 6 depends on the expansion pressure at the nozzle exit. If such a pressure is sufficiently low, the flow in certain portions of the separator will be supersonic and may produce complex system of shocks with large irreversibilities, yielding low separation and overall system efficiencies. For this reason, the two-phase flow in the inclined plate separator should be kept subsonic or the gas or vapor expansion pressures in the nozzle should be limited to modest values. For a system operating with lithium temperature of 1200 degrees Kelvin and cesium as a transporting gas, the cesium high pressure is limited to about 8 bar and low pressure to about 0.2 bar, with the condensing temperature of 800 degrees Kelvin (see FIG. 4). For a 100 kWe system of FIG. 3 operating in a space-based environment, the conservative working parameters of the system are: lithium consumption of 0.02 kg/s, $SF_6$ consumption of 0.06 kg/s, Li recirculation rate of 30 kg/s, cesium flow rate of 1 kg/s, radiator heat dissipation of 500 kW, heat pipe radiator area of 25 $m^2$, and MHD channel dimensions of 1.5 cm by 15 cm by 1 m long and operating at about 1 Tesla magnetic field. The power generating capacity of such a system is therefore in eccess of 100 MW/$m^3$ with an electrical power output of 30 MWe/$m^3$. The construction materials of the systems in FIGS. 1 to 3 should be Nb-1 percent Zr or MoRe alloys which are resistant to high temperature Li, $SF_6$ and cesium.

I claim:

1. A magnetohydrodynamic power generation system using lithium and sulfur-hexafluoride whereby lithium supplied from a lithium supply tank and sulfur hexafluoride supplied from a storage tank are mixed and reacted in the magnetohydrodynamic channel and mixed with a transporting fluid downstream of the channel in a mixer/nozzle, or whereby the liquid lithium exiting from the magnetohydrodynamic channel is mixed and reacted with the sulfur hexafluoride gas and transporting fluid in a mixer/combustor/nozzle unit downstream of the channel and consequently separated into lithium and transporting fluid streams, such that after being cleaned from the products of combustion the unreacted lithium is returned to the generator channel inlet, whereas the transporting fluid is returned to the mixer/nozzle or mixer/combustor/nozzle unit in a closed cycle or rejected in an open cycle system.

2. The system of claim 1 whereby no lithium supply tank and/or salts removal unit are used, such that the initial lithium charge in the system is depleted as it is being recirculated through the system and reacted with sulfur hexafluoride.

3. System components of claim 1 whereby the magnetohydrodynamic generator is placed after the mixer/nozzle or mixer/combustor/nozzle where lithium, sulfur hexafluoride and transporting fluid are mixed and reaction between lithium and sulfur hexafluoride takes place.

4. The system of claim 1 where the salts or products of combustion are separated by a cold trap operating below 1065 degree kelvin that collects salts as solids.

5. The system of claim 1 whereby a sulfur hexafluoride gas injector employing many small holes or nozzles opened and closed by needles is placed at the inlet of the magnetohydrodynamic channel where lithium and sulfur hexafluoride gas are reacted, or is placed at the inlet of a mixer/combustor/nozzle where lithium, sulfur hexafluoride and transporting fluid are mixed and reaction between lithium and sulfur hexafluoride takes place.

* * * * *